Feb. 19, 1946. A. PETERSON 2,395,140
HANDLE FOR COOKING UTENSILS
Filed April 10, 1944
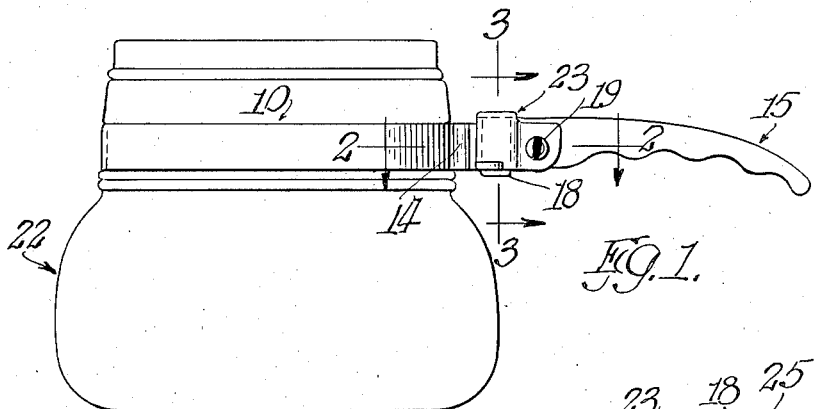
Fig. 1.
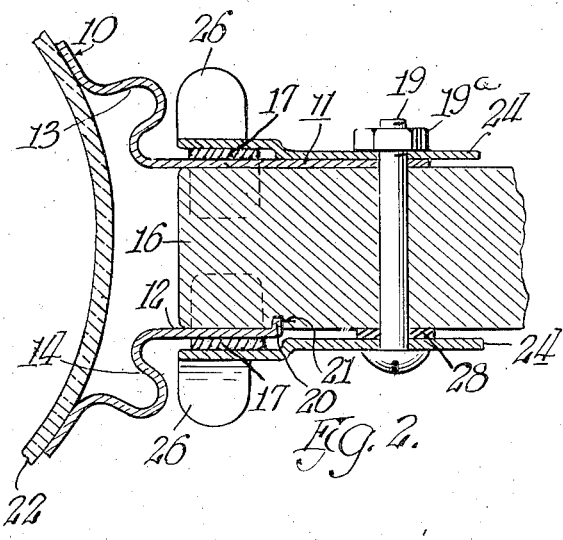
Fig. 2.
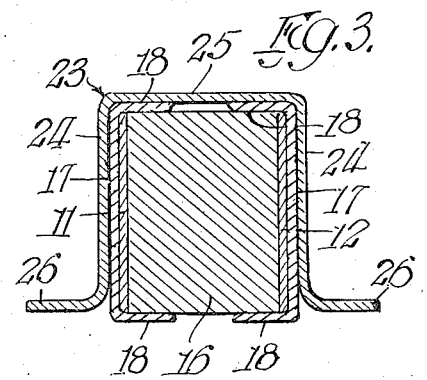
Fig. 3.
Fig. 5.
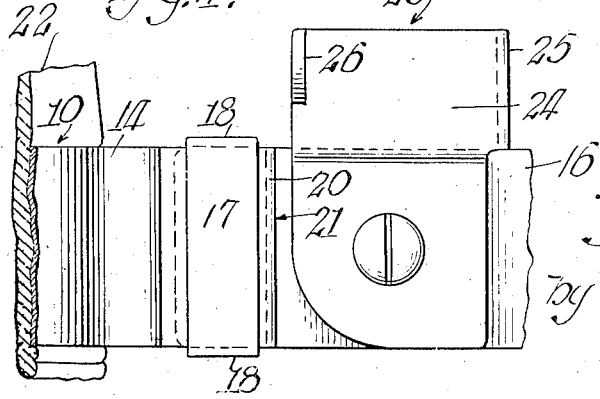
Fig. 4.
Inventor
Amos Peterson Patented Feb. 19, 1946

2,395,140

UNITED STATES PATENT OFFICE 2,395,140

HANDLE FOR COOKING UTENSILS

Amos Peterson, Berwyn, Ill., assignor to Club Aluminum Products Company, Chicago, Ill., a corporation of Delaware Application April 10, 1944, Serial No. 530,277

8 Claims. (Cl. 294—27)

This invention relates to improvements in handles for cooking utensils and it consists of the matters hereinafter described and more particularly pointed out in the appended claims.

The invention is more especially concerned with a handle construction of the kind which includes a flexible band that encircles or surrounds a part of the utensil and a handle member so operatively secured to the band that the band and handle member form an assembly which may be applied to and removed from the utensil.

One of the objects of the invention is to provide a handle assembly for a cooking utensil which may be readily applied to and removed from the utensil without requiring the removal of nuts or bolts and the like.

A further object of the invention is to provide a handle assembly which adjusts itself to accommodate irregularities in sizes of the associated part of the utensil within reasonable limits.

Also, it is an object of the invention to provide a handle assembly which positively secures the handle to the utensil in a manner preventing relative movement therebetween under the weight of the utensil and contents when the utensil is being carried by means of the handle.

Furthermore, it is an object of the invention to provide a handle assembly which is of simple construction for low cost production and is strong and rigid and cannot work loose from the utensil in the use thereof.

The above mentioned objects of the invention as well as others will more fully appear as the specification proceeds.

In the drawing:

Fig. 1 is a view in side elevation of a cooking utensil to which the improved handle assembly has been applied.

Fig. 2 is a horizontal detail sectional view through a part of Fig. 1 as taken on the line 2—2 thereof and on a scale enlarged thereover.

Fig. 3 is a vertical detail sectional view through a part of Fig. 1 as taken on the line 3—3 thereof and on the scale of Fig. 2.

Fig. 4 is a detail view in side elevation of the parts appearing in Fig. 2 and shows certain of said parts in a position changed from that appearing in Figs. 1 and 2.

Fig. 5 is a perspective view of a certain clip embodied in the improved handle assembly, and which clip is shown on a scale smaller than that of Figs. 2, 3 and 4 and larger than that of Fig. 1.

Referring now in detail to that embodiment of the invention illustrated in the accompanying drawing, 10 indicates a band made of a relatively thin flat strip of metal of the desired flexibility and formed to have a set in substantially a circular shape. The extremities of the band are formed as a pair of straight relatively long and short arms 11 and 12 respectively and said arms are connected to the associated end of the band by reversely curved or substantially S shaped expansible and contractible loops 13 and 14 respectively.

15 indicates a lever-like handle, the inner end portion 16 of which is disposed between and has flat sides that are engaged by the flat sides of the arms 11 and 12 when the band and handle are fully assembled. The end portion 16 of the handle has a vertical height or thickness approximating the edgewise height of the arms 11 and 12.

Fixed to the outer surface of each arm 11 and 12, somewhat adjacent the loops 13 and 14 is a clip 17, the ends of which are bent over to form inwardly extending top and bottom ears 18—18 and which have bevelled end edges as best appears in Fig. 3. The clip 17 may be secured in any desired manner to the respective arms, spot welding being one suitable means.

The long arm 11 of the band is secured to the associated side of the handle end portion 16 by means of a bolt, rivet or like member 19 and which member has another function as will appear later. The short arm 12 is provided with an inturned extremity 20 which is adapted to engage snugly in a narrow vertical groove 21 (see Fig. 2) in the associated side of the handle end portion when the band 10 and handle 15 are disposed in handle forming relation about a part of a cooking utensil 22.

23 indicates a clip by which the arms 11 and 12 are clamped against the associated sides of the handle portion 16. This clip, which is best shown in perspective in Fig. 5, includes a pair of laterally spaced clamping arms 24—24 which are connected together at the top of one end by a bridge or thumb piece 25. At the bottom of said end of each arm is an outwardly extending ear 26. The other end of each arm is offset inwardly a distance approximating the thickness of the stock of the clips 17 and is provided with a hole 27 therein. The bolt 19, before mentioned, passes through the holes 27 in said arms as well as through the handle portion 16 and arm 11 and a nut 19a is associated with the threaded end of the bolt.

A spacing washer 28 (see Fig. 2) is disposed upon said bolt to take up the thickness of the short arm 12 of the band. It will be noted that the bolt 19 therefor not only secures the arm 11 of the band 10 to the handle portion 16, but it also provides a pivotal connection for the clip 23 and whereby said clip may be swung from a position clamping the arm 12 to the handle portion 16 as shown in Figs. 1, 2 and 3 to a position as shown in Fig. 4 and in which the arm 12 is released from the handle portion.

In applying the handle assembly described, to a neck-like part of the utensil shown in Fig. 1, the clip 23 is first swung into upright position shown in Fig. 4 and wherein the arm 12 is released from the handle portion 16 so as to spring outwardly therefrom. This provides a diameter for the band 10 of such a dimension that the now open band may be placed down over the top end of the utensil to be disposed in the plane of the before-mentioned neck-like part of said utensil.

When so positioned, the loops 13 and 14 constitute lever-like finger engageable parts which when pressed inwardly toward each other, by means of the thumb and fingers of one hand, cause the arm 12 to move inwardly towards and into engagement with its associated side of the handle portion 16. When said arm is engaged with said side of the handle portion, its extremity 20 will enter the groove 21 in the handle portion 16 and the parts 18—18 of the clip 17 will engage with the top and bottom surfaces of said handle portion. By using the thumb of the other hand to press forwardly and then downwardly upon the bridge piece 25 of the clip 23, said clip is swung about the bolt 19 so that the rounded junction of the ears 26 with the arms 24—24 will cause the clip 23 to swing into the clamping position as in Figs. 1, 2 and 3 wherein it straddles said arms and handle portion. It is pointed out that as the clip 23 approaches the bottom limit of its clamping position, it exerts an increasing inward pressure clamping action on the arms 11 and 12, through the clips 17—17 to tightly clamp said arms against the sides of the handle portion 16.

It will be understood that the utensil, which is usually made of glass, is not always uniform in dimension and the part thereof to be encircled or surrounded by the band may be out of round or larger or smaller in circumference within certain tolerances.

By reason of the use of the loops 13 and 14 which connect the arms 11 and 12 to the associated end of the band 10, these loops provide the expansion and contraction necessary to permit the band to accommodate and fit a utensil despite the irregularities in dimensions of the utensil, as well as providing means by which the band may be manipulated as before described.

To clean the utensil when desired, the band may be quickly removed as follows. The loops 13 and 14 of the band are squeezed toward each other by the fingers of one hand and the ears 26 of the clip 23 are then grasped by the fingers and thumb of the other hand and an upward lift is exerted thereon. This swings the clip into the upright position shown in Fig. 4 and wherein the arm 24 of said clip associated with the arm 12 clears said arm. This arm now springs outwardly so that the band expands and may be lifted off the utensil from its top end. Both the band and handle, as well as the utensil itself, may be readily washed. The handle structure may then be reapplied to the utensil, as before described.

It is pointed out that when the band and handle have been applied to the utensil, the loops 13 and 14 and the ears 26 of the clip are disposed in an out of the way position wherein the ears cannot be so engaged by accident as to cause them to unlock the band from the utensil.

When the utensil is being carried by the handle 15, it is apparent that the weight of the utensil and its contents exerts a strain at the junction of the handle and band and which strain is amply overcome by reason of the engagement the ears 18—18 have with the handle end portion 16. Thus play cannot develop between the handle and utensil so that it is safe to use under all conditions.

It will be observed that the stock of the handle 15 at the end is not of reduced size, hence its strength is maintained, thus facilitating the use of plastics or other material which have good heat insulating qualities but may not have great structural strength.

While in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. A handle for a cooking utensil embodying therein a band for surrounding a part of the utensil and having ends that terminate as outwardly extending arms, a handle having an end portion disposed between and having side surfaces engaged by said arms, one of said arms being fixed to said handle end portion and the other arm being detachably engaged with said handle end portion, means carried by said other arm and engaged with the top and bottom surfaces of said handle end portion, and pivoted means carried by and in one position straddling said handle end portion and embracing parts of said arms to hold the first mentioned means in operative relation on the handle, said pivoted means when swung into another position clearing said first mentioned means.

2. A handle for a cooking utensil embodying therein a band for surrounding a part of the utensil and having ends that terminate as outwardly extending arms, a handle having an end portion disposed between and having side surfaces engaged by said arms, a bolt passing laterally through said handle end portion and securing one of said arms to said handle end portion, the other of said arms being detachably engaged with said handle end portion, means carried by said other arm and engaged with the top and bottom surfaces of said handle end portion, and means pivotally mounted on said bolt and straddling said handle end portion and embracing parts of said arm and coacting with said first mentioned means in securing them together in operative relation.

3. A handle for a cooking utensil embodying therein a band for surrounding a part of the utensil and having ends formed to provide expansion loops that terminate as outwardly extending arms, a handle having an end portion disposed between and having side surfaces engaged by said arms, means for attaching one of said arms to said handle end portion, the other of said arms being detachably engaged with said handle end portion, and a clip pivoted on said attaching means and including parts normally straddling said handle end portion and embracing parts of said arms for operatively securing said arms and handle end portion in operative relation, said clip being adapted to be swung into a second position clearing said parts of said arms.

4. A handle for a cooking utensil embodying therein a band for surrounding a part of the utensil and having ends formed to provide expansion loops that terminate as outwardly extending arms, a handle having an end portion disposed between and having side surfaces engaged by said arms, means carried by said arms and engaged with the top and bottom surfaces of said handle end portion, a member attaching one of said arms to said handle portion, and means pivotally mounted on said member and in one position straddling said handle end portion and embracing parts of said arms for operatively securing said arms and handle end portion in operative relation, said pivotally mounted means when swung into a second position, clearing said means carried by said arms to permit the removal of the band from said part of the utensil.

5. A handle for a cooking utensil embodying therein a band for encircling a part of the utensil and having ends formed to provide expansion loops that terminate as outwardly extending arms, a handle having an end portion disposed between and having side surfaces engaged by said arms, a bolt extending laterally through said handle end portion and securing one of said arms thereto, the other of said arms detachably engaging said handle end portion, means carried by said arms and engaged with the top and bottom surfaces of said handle end portion, and means pivotally mounted on said bolt and straddling said handle end portion and embracing parts of said arms and coacting with the first mentioned means in operatively securing them together.

6. A handle for a cooking utensil embodying therein a band for surrounding a part of the utensil and having ends formed to provide substantially S shaped parts that terminate as outwardly extending arms and which parts function as finger engageable parts in drawing said band ends toward each other, a handle having a portion disposed in operative relation to said arms, and means for securing said arms and said handle portion together.

7. A unitary handle assembly adapted for removable attachment to a part of a cooking utensil, said assembly embodying therein a handle and a resilient band for surrounding said part of the utensil and which band has ends that terminate as outwardly extending arms, one of which is fixed to one side of a part of said handle, the other of said arms being normally sprung away and spaced laterally from the other side of said part of the handle, but being engaged therewith when said assembly is disposed upon said utensil, and means having a pivotal connection with said part of the handle and swingable from a position securing said other arm in place against its associated part of the handle to a position releasing said arm therefrom to permit it to spring back to its normal position for the removal of the assembly as a unit from said utensil.

8. A unitary handle assembly adapted for removable attachment to a part of a cooking utensil, said assembly embodying therein a handle and a resilient band for surrounding said part of the utensil and which band has ends that terminate as outwardly extending arms, a member fixing one of said arms to one side of a part of said handle, the other of said arms being normally sprung away and spaced laterally from the other side of said part of the handle but being engaged therewith when said assembly is disposed upon said utensil, and means pivoted on said member and swingable from a position securing said other arm in place against its associated part of the handle to a position releasing said arm therefrom to permit it to spring back to its normal position for the removal of the assembly as a unit from said utensil.

AMOS PETERSON.